United States Patent [19]
Hardy et al.

[11] Patent Number: 6,112,229
[45] Date of Patent: Aug. 29, 2000

[54] SECURE TERMINAL AND METHOD OF COMMUNICATING MESSAGES AMONG PROCESSING SYSTEMS INTERNAL THERETO

[75] Inventors: Douglas Allan Hardy; Craig Robert Fossey, both of Scottsdale, Ariz.

[73] Assignee: Motorola, Inc., Schaumburg, Ill.

[21] Appl. No.: 09/071,184

[22] Filed: May 1, 1998

[51] Int. Cl.[7] .................................................. G06F 13/00
[52] U.S. Cl. .......................... 709/206; 709/211; 709/213; 710/57
[58] Field of Search ................................... 709/202, 203, 709/204, 206, 208, 211, 212, 213, 215, 214, 237; 710/20, 52, 53, 56, 57, 110, 260

[56] References Cited

U.S. PATENT DOCUMENTS

| | | |
|---|---|---|
| 4,933,967 | 6/1990 | Lo et al. ................................. 379/207 |
| 5,121,479 | 6/1992 | O'Brien ..................................... 710/34 |
| 5,247,616 | 9/1993 | Berggren et al. ........................ 709/213 |
| 5,327,558 | 7/1994 | Burke et al. ................................ 710/8 |
| 5,754,854 | 5/1998 | Kanamori et al. ...................... 709/104 |
| 5,930,471 | 7/1999 | Milewski et al. ....................... 709/204 |

*Primary Examiner*—Viet D. Vu
*Attorney, Agent, or Firm*—Frank J. Bogacz; Gregory J. Gorrie

[57] ABSTRACT

A secure terminal includes a host (105) and slaves (125) which send and receive messages via a peripheral component interconnect (PCI) bus (130). The host allows slaves to receive messages from the host and send messages to the host. The host prevents slave-to-slave communication of messages. The host and each slave include interface logic (120) coupled to the PCI bus and a memory (200) for coupling a processor (110) to the interface logic (120). Each dual-port RAM (200) includes a first memory portion for receiving messages from a sender and a second memory portion for storing messages to be transmitted to a receiver.

14 Claims, 4 Drawing Sheets

6,112,229

SECURE TERMINAL AND METHOD OF COMMUNICATING MESSAGES AMONG PROCESSING SYSTEMS INTERNAL THERETO

FIELD OF THE INVENTION

This invention relates in general to the field of communications and, in particular, to communications in a secure terminal system.

BACKGROUND OF THE INVENTION

The computer industry has created various standards for interconnecting elements of a computer system. One such standard is the peripheral component interconnect (PCI) bus standard. Among other things, the standard for the PCI bus defines the electrical and mechanical specifications for interconnecting elements (e.g., host, slaves, bridges) of a computer system. A limitation of such a standard is its failure to specify a system and method for communicating messages (e.g., information) between elements connected via the PCI bus. For example, transmitting a message from one element to another element.

When security is needed for communication between elements, existing systems which communicate via PCI bus do not restrict element-to-element communication. For example, in existing computer systems, each element may be a host and a slave, although not simultaneously. An element is either a host or a slave based on a request from that element to become a host. Preferably, when no other element is presently requesting to be a host, a request to become a host is granted by the PCI bus. So, the standard for PCI bus allows any element to become a host during element-to-element communication. In typical systems using PCI bus, host-to-slave, slave-to-host, and slave-to-slave communications are allowable. Accordingly, existing systems which adhere to the standard for PCI bus, fail to provide a secure mechanism for controlling communication between elements.

Thus, what is needed are a system and method for communicating messages between elements which are connected via a PCI bus. What is also needed are a system and method which provide security for controlling communication between elements connected by a PCI bus.

BRIEF DESCRIPTION OF THE DRAWINGS

A complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE PREFERRED EMBODIMENTS

The present invention provides, among other things, a system and method for communicating messages between elements connected via a peripheral component interconnect (PCI) bus. The present invention also provides a system and method for controlling communication between elements connected by a PCI bus.

Figure 1:
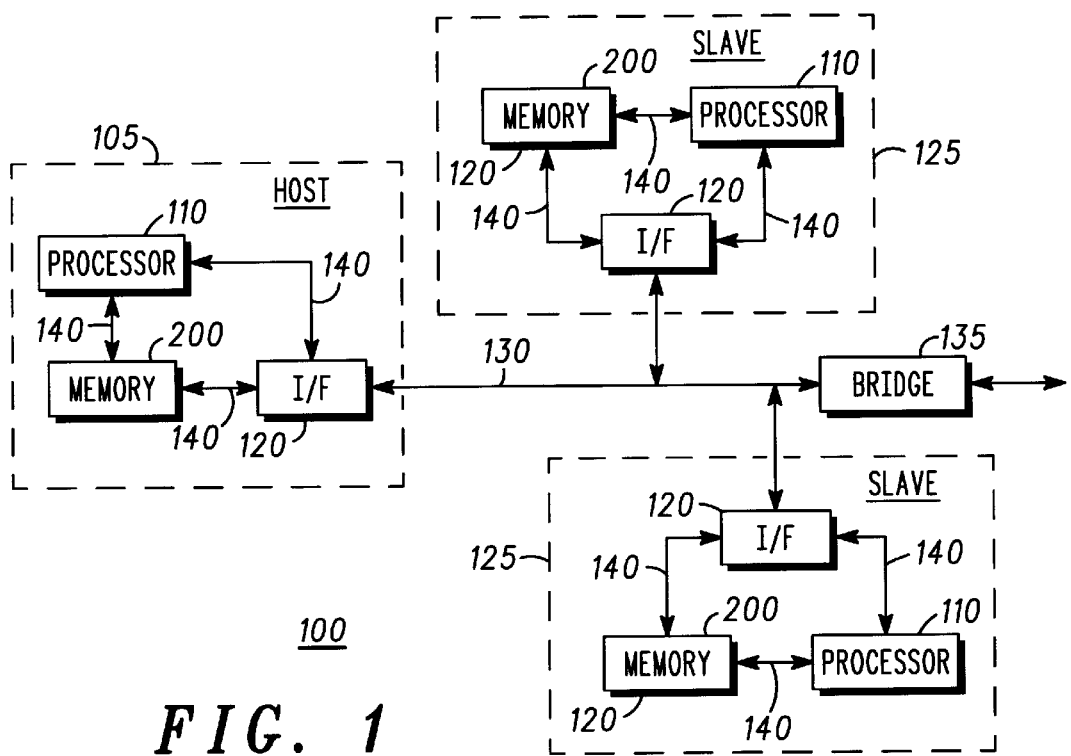
FIG. 1 is a simplified block diagram of a secure terminal system in accordance with a preferred embodiment of the present invention.

FIG. 1 is a simplified block diagram of a secure terminal system in accordance with a preferred embodiment of the present invention. Secure Terminal System (STS) 100 illustrates a system for performing, among other things, basic computer operations (e.g., executing a software program, communicating externally via a modem, storing a file to and retrieving a file from tape and disk, transmitting a message from one element to another element, etc.) In a preferred embodiment, STS 100 primarily includes host 105, slaves 125, and bridge 135. Preferably, each primary element (i.e., host 105, slaves 125, and bridge 135) is coupled to every other primary element of STS 100 via PCI bus 130.

In a preferred embodiment, host 105 is the only bus controller for PCI bus 130. In other words, in STS 100, the PCI bus "request" and "grant" signals are controlled by host 105. Therefore, in a preferred embodiment, no element other than host 105 may request to become the bus controller. So, communication between elements is performed under control of host 105.

In another embodiment, slaves 125 may make a request to become the bus controller. Similar to the discussion above for host 105 becoming a bus controller, slaves 125 become a bus controller by asserting the PCI bus "request" signal and receiving the "grant" signal. When a slave 125 becomes the bus controller, the slave 125 is retitled host 105. Correspondingly, the element which was previously host 105 becomes a slave 125.

Host 105 and slaves 125 are preferably comprised of similar elements. In a preferred embodiment, host 105 and slaves 125 are comprised of a processor 110, memory 200, and interface logic 120. Preferably, each of the elements are coupled via internal bus 140. Processor 110 is preferably a microprocessor although other processors such as microcontrollers, reduced instruction set computer (RISC) processors, and others are also suitable. Processor 110 performs a software program which is appropriate for controlling the associated element. For example, when processor 110 is a microprocessor, processor 110 may be executing an application program such as a word processing program. Alternatively, when processor 110 is a microcontroller, processor 110 may be executing a software program for controlling an integrated services digital network (ISDN) modem.

Preferably, processor 110 sends messages to and receives messages from memory 200. In a preferred embodiment, host 105 transmits messages from its associated processor 110 to memory 200 of a slave 125. When a slave 125 transmits a message from its associated processor 110, the message is stored in memory 200 of the slave which transmits the message. Host 105 is signaled by an interrupt via PCI bus 130 when a "slave-to-host" message is ready for host 105 to receive.

In a preferred embodiment, memory 200 is a dual port random access memory (DPRAM) (discussed below). Interface logic 120 is comprised of logic circuits for coupling PCI bus 130 and internal bus 140. Preferably, interface logic 120 provides "pass-through" functionality. Pass-through functionality is defined herein to mean directly addressing memory 200 from one element to another element.

Bridge 135 is well defined in the standard for PCI bus. Bridge 135 is a bridge for "extending" PCI bus 130. Preferably, bridge 135 provides means for extending PCI bus 130 so additional slaves 125 may be connected to PCI bus 130.

Figure 2:
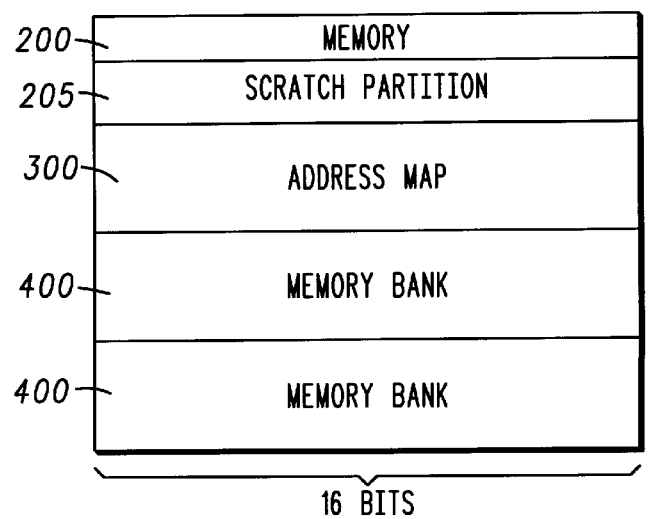
FIG. 2 illustrates a memory in accordance with a preferred embodiment of the present invention.

FIG. 2 illustrates a memory in accordance with a preferred embodiment of the present invention. Memory 200 illustrates a preferred partition for a memory of an element (e.g., host, slave). In a preferred embodiment, memory 200 is a 16-bit memory, although sizes of 8-bit, 32-bit, 64-bit, and others are suitable. Scratch partition 205 represents program, data, and scratch memory areas for processor 110. In a preferred embodiment, scratch partition 205 is part of a dual port random access memory (DPRAM) as described above for FIG. 1, although, in another embodiment, scratch partition 205 may be random access memory (RAM) or other suitable read/write memory. Scratch partition 205 is a memory portion where machine codes for software programs, data for software programs, and run-time (e.g., dynamic) data for software programs are stored. In other words, scratch partition 205 is a memory area where software and data operated on by processor 110 are stored.

Address map 300 is a memory partition reserved for a sender (e.g., host, slave) of messages to track memory available for storing messages. Preferably, address map 300 is used to track memory available in one or more memory banks (discussed below).

Memory bank 400 is a memory partition reserved for, among other things, a sender of messages to store transmitted messages. Preferably, when memory 200 is included in a slave, each memory 200 has two memory bank 400 partitions; one memory bank 400 for host-to-slave messages and one memory bank 400 for slave-to-host messages. In a preferred embodiment of the present invention, when memory 200 is included in a host, memory banks 400 are not necessary for communicating messages between a host and a slave.

Figure 3:
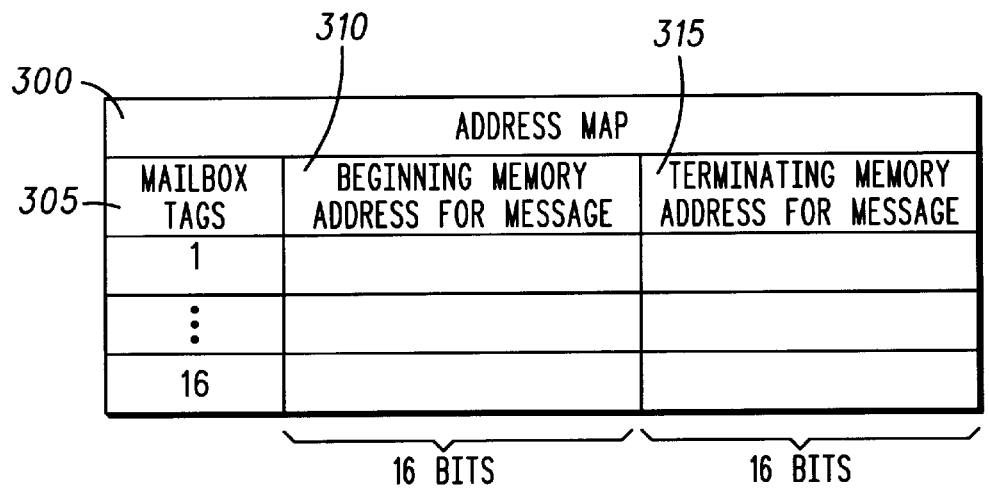
FIG. 3 is an address map for a message memory in accordance with a preferred embodiment of the present invention.

FIG. 3 is an address map for a message memory in accordance with a preferred embodiment of the present invention. Address map 300 is a map of the "in use" portions of a message memory in a memory bank (discussed below). An "in use" portion of message memory is a portion of memory where a message is stored. Therefore, the portions of the message memory which do not have part of a message stored are available for storing other messages.

Preferably, address map 300 is updated by a sender of a message. For example, when a host sends a message to a slave, the host updates the corresponding address map 300 in the host's memory 200. Preferably, the host has separate address map 300 partitions for each slave (e.g., receiver). Likewise, when a slave sends a message to a host, the slave updates the corresponding address map 300 in the slave's memory 200. Preferably, the slave sending the message has one address map 300 partition in the slave's memory 200 for the host (e.g., receiver).

In another embodiment, when a host sends a message to a slave, the host updates the corresponding address map 300 in the slave's memory 200. Preferably, the host has separate address map 300 partitions in each slave's memory 200 (e.g., receiver).

In a preferred embodiment, address map 300 includes mailbox tags 305, beginning memory addresses (BMA) 310, and terminating memory addresses (TMA) 315. In a preferred embodiment, mailbox tags 305 identify sixteen BMA 310 and TMA 315 pairs. Preferably, mailbox tags 305 do not represent any physical memory with respect to address map 300 in memory 200. For example, when referring to host-to-slave communications, mailbox tag 1 represents the beginning memory address and terminating memory address in the slave's message memory where a message from the host is stored. Preferably, BMA 310 and TMA 315 each represent sixteen physical memory locations in memory 200.

Preferably, BMA 310 and TMA 315 each represent a 16-bit memory location for storing an address of another memory location within a message memory. In other embodiments, other sizes for BMA 310 and TMA 315 are based on the number of addressable memory locations for a message memory. Also, in another embodiment, more or less numbers of mailbox tags 305 may be desirable depending on the size of associated messages.

Figure 4:
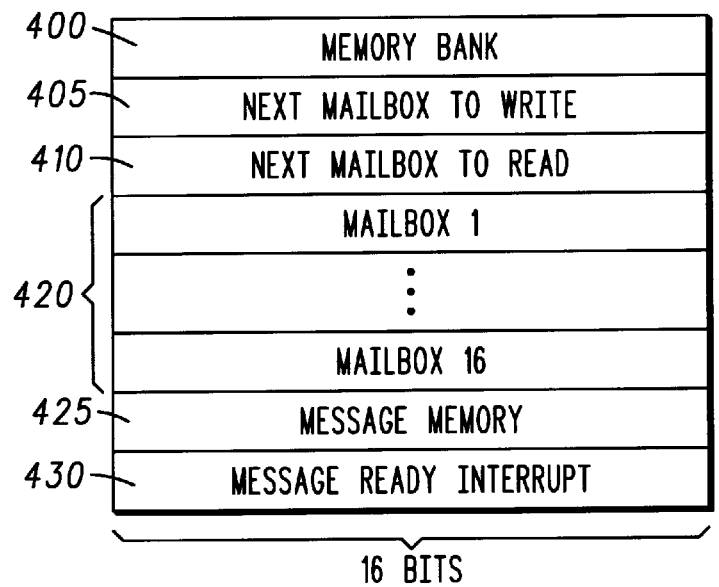
FIG. 4 is simplified memory partition of a memory bank in accordance with a preferred embodiment of the present invention.

FIG. 4 is simplified memory partition of a memory bank in accordance with a preferred embodiment of the present invention. In a preferred embodiment of the present invention, memory bank 400 is a portion of memory for storing mailboxes, mailbox pointers, messages, and "message-ready" interrupts.

Memory bank 400 is primarily controlled by a sender of a message. For example, when a message is transmitted from a host to a slave, memory bank 400 is located in the slave. The host checks its address map 300 to determine when sufficient memory is available for receiving the message in the slave's message memory 425. When sufficient memory is available, the host transmits the message. The host then checks next-mailbox-to-write pointer 405 to determine which of mailboxes 420 to store the beginning memory address and terminating memory address associated with the message. In a preferred embodiment, the host updates the associated mailbox, advances next-mailbox-to-write pointer 405 to point to the next mailbox in a ring buffer of mailboxes, and writes a value to message-ready interrupt 430. Preferably, when a value is written to message-ready interrupt 430, memory 200 sends an interrupt to processor 110 for the slave to signal that a message is ready for processing.

Correspondingly, the slave reads next-mailbox-to-read pointer 410 to determine which of mailboxes 420 to read the beginning memory address and terminating memory address for the message. In a preferred embodiment, the slave's processor may be notified by an interrupt when a message is ready for processing. Also, since mailboxes 420 are represented as a ring buffer of mailboxes, a slave compares next-mailbox-to-write pointer 405 (updated by the host) and next-mailbox-to-read pointer 410 (updated by the slave) plus one mailbox to determine when a message is ready for processing. So, when the comparison fails, the slave determines another message is ready for processing.

As for the determining the size of the message, in another embodiment, the slave only reads the beginning memory address associated with next-mailbox-to-read pointer 410 and determines the size of the message from a "message size" parameter stored in a header of the message.

Additionally, when a message is transmitted from a slave to a host, memory bank 400 is a second memory partition also located in the slave's memory 200. In other embodiments, the host's memory 200 may store messages which are transmitted from and received by the host.

Preferably, after a receiver of a message completes processing the message, the receiver advances next-mailbox-to-read pointer 410 to point to the next mailbox in the ring buffer of mail of mailboxes 420.

Figure 5:
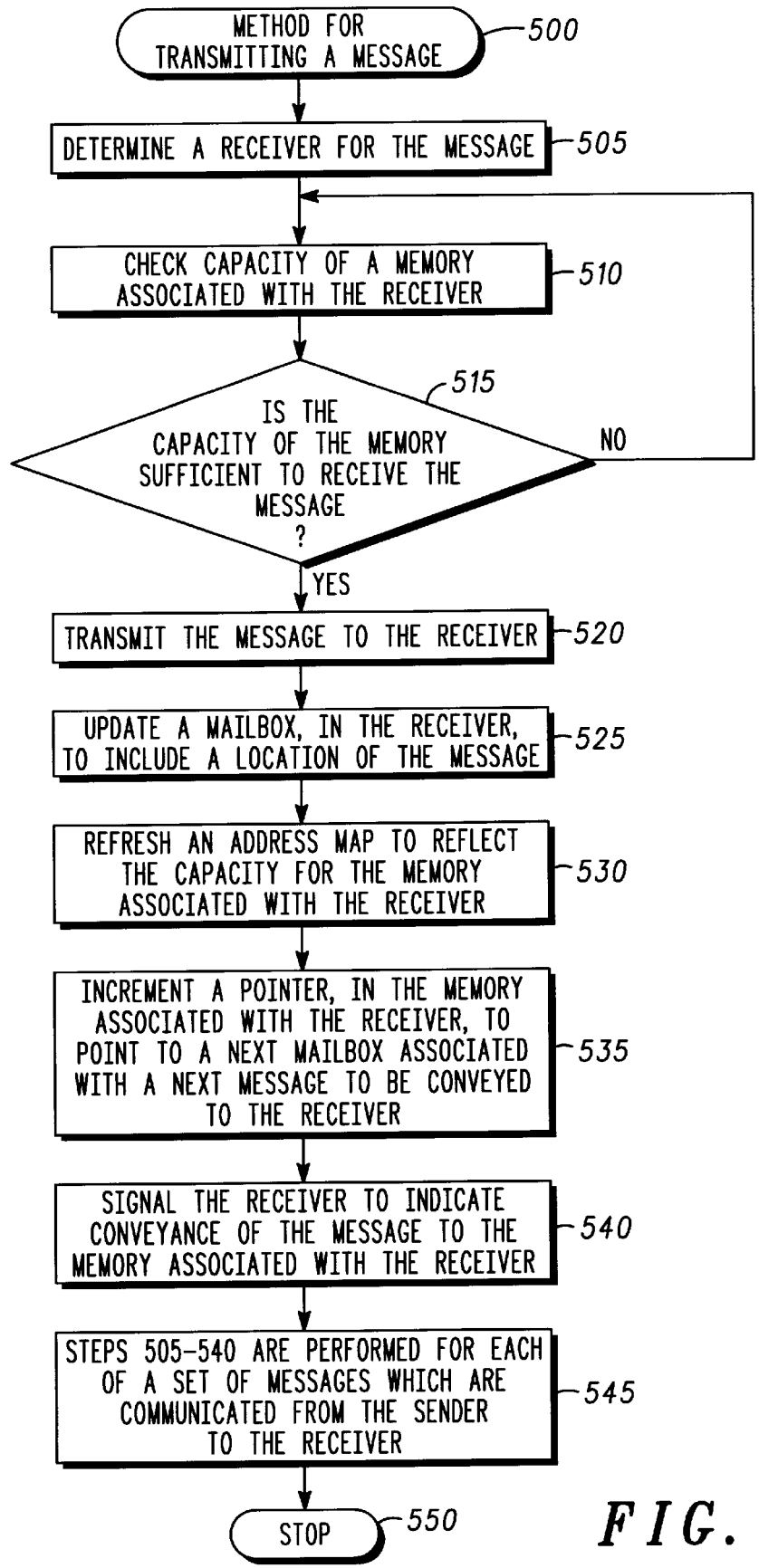
FIG. 5 is a simplified flow chart for a method for transmitting a message in accordance with a preferred embodiment of the present invention.

FIG. 5 is a simplified flow chart for a method for transmitting a message in accordance with a preferred embodiment of the present invention. In a preferred embodiment, method 500 is a method for transmitting a message from a sender to a receiver. Preferably, transmitting and receiving a message includes host-to-slave and slave-to-host communications. Method 500 is performed by a sender for both host-to-slave and slave-to-host communications. Preferably, for host-to-slave and slave-to-host communications, when a message is transmitted from a sender to a receiver, the message is stored in the memory of the slave prior to being processed by the receiver. For example, when host-to-slave communications are performed, the host stores a message in the memory of the slave. When slave-to-host communications are performed, the slave stores a message in the memory of the slave. A method for receiving a message is discussed below for FIG. 6.

In step 505, a receiver for the message is determined. In a preferred embodiment, a sender of a message determines a receiver for a message. When a host transmits a message to a slave, the host determines which slave is to receive the message. For example, when a software program executing on a host determines a modem command is to be transmitted to a modem, the host determines that the slave controlling the modem is to receive the message. Alternatively, when a response message from a slave is transmitted to a host (e.g., slave-to-host communications), the slave stores the response message in a message memory included in the slave's memory but associated with the host. In a preferred embodiment, a slave transmits messages to a host and not to other slaves. However, in another embodiment, slave-to-slave communication is possible.

In step 510, capacity of a memory associated with the receiver is checked. In a preferred embodiment, a sender determines the capacity of a message memory associated with the receiver. For example, before a host transmits a message to a slave, the host determines when the capacity of the message memory for the slave is sufficient for storing the message. In this example, the host checks an address map which is stored in the host's memory. Preferably, the address map represents the available capacity of a message memory associated with the slave. In step 515, when the capacity of the memory associated with the receiver is insufficient for receiving a message, step 510 is repeated until sufficient memory is available, then step 520 is performed.

Additionally, in a preferred embodiment, step 515 includes a comparison between the next-mailbox-to-read pointer and the next-mailbox-to-write pointer associated with the receiver's message memory. When the sender determines the next-mailbox-to-read pointer and the next-mailbox-to-write pointer each point to the same mailbox, and the mailbox tags for the address map associated with the receiver's message memory each represent a message, step 510 is repeated until the next-mailbox-to-read pointer advances by one or more mailboxes. In other words, when no mailboxes are available for storing an address associated with a message, step 510 is repeated until a mailbox is available.

In another embodiment, before a message is transmitted from a slave to a host, the capacity for the message memory for the host is checked. Preferably, the message memory for the host is included in one of two memory banks for the slave transmitting the message. In a different embodiment, the message memory for the host is included in one of two memory banks for the memory for the host.

In step 520, the message is transmitted to the receiver. In a preferred embodiment, a sender transmits a message to the memory associated with the receiver. For example, when a message is transmitted from a host to a slave, the host transmits the message to the message memory for the slave. Preferably, the message memory is included in the memory for the slave. When a message is transmitted from a slave to a host, the slave transmits the message to the message memory for the host. Preferably, the message memory is included in the memory for the slave. In another embodiment, the slave transmits messages to a message memory included in the host.

In step 525, a mailbox, in the receiver, is updated to contain a location of the message. In a preferred embodiment, after a sender transmits a message to a receiver, the sender updates a mailbox associated with the message. For example, after a host transmits a message to the message memory for a receiver, the host updates a mailbox to include the location in memory of the message. Preferably, the host updates the mailbox to include the beginning memory address and the terminating memory address for the message. In another embodiment, the host updates the mailbox to include the beginning memory address for the message and the receiver determines the terminating memory address based on size information stored in a header for the message.

In step 530, an address map is refreshed to reflect the capacity for the memory associated with the receiver. In a preferred embodiment, the sender refreshes an address map to reflect the capacity of the message memory associated with the receiver. For example, after a host updates a mailbox for a message, the host refreshes the address map associated with the message to reflect the available memory in the message memory. Likewise, after a slave updates a mailbox for a message which is transmitted to a host, the slave refreshes an address map associated with the message to reflect the available memory in the message memory. Preferably, the address map is stored in the address map partition of the sender's memory. In a preferred embodiment, message memory for host-to-slave and slave-to-host communications is included in the respective memory bank in the slave's memory. In another embodiment, the message memory is included in the respective memory bank in the receiver's memory.

Preferably, message memory is reclaimed for use when a sender determines a message has been processed by a receiver. The sender determines memory is available to be reclaimed when the receiver's next-mailbox-to-read pointer has advanced "past" the associated message. When the sender determines a receiver has processed a message, the sender updates the corresponding address map to reflect the available memory. The check associated with reclaiming memory may be performed at any time.

In step 535, a pointer is incremented, in the memory associated with the receiver, to point to a next mailbox associated with a next message to be conveyed to the receiver. In a preferred embodiment, the sender of the message increments the next-mailbox-to-write pointer to point to the next mailbox in a ring buffer of mailboxes.

Preferably, the next-mailbox-to-write pointer points to the next mailbox to receive addresses for a yet-to-be-received message.

In step 540, the receiver is signaled to indicate conveyance of the message to the memory associated with the receiver. In a preferred embodiment, a sender signals conveyance of a message by storing a value (e.g., 1) in a message-ready interrupt associated with the receiver of the message. When a value is stored in the message-ready interrupt for a memory, the memory signals a receiver's processor to indicate a message is ready for processing. For example, a host signals conveyance of a message to a slave by storing a value in the message-ready interrupt for the message memory associated with the message. The memory asserts an interrupt to signal the processor that a message is waiting to be processed.

Another example is when a slave signals conveyance of a message to a host by storing a value in the message-ready interrupt for the memory bank associated with the message. The memory asserts an interrupt to signal the processor for the host that a message is waiting to be processed.

In step 545, the method is performed for each of a set of messages communicated from the sender to the receiver. In a preferred embodiment, steps 505–540 are performed for each message transmitted from a sender to a receiver. When no additional messages are to be transmitted from the sender to the receiver, the method ends 550.

Figure 6:
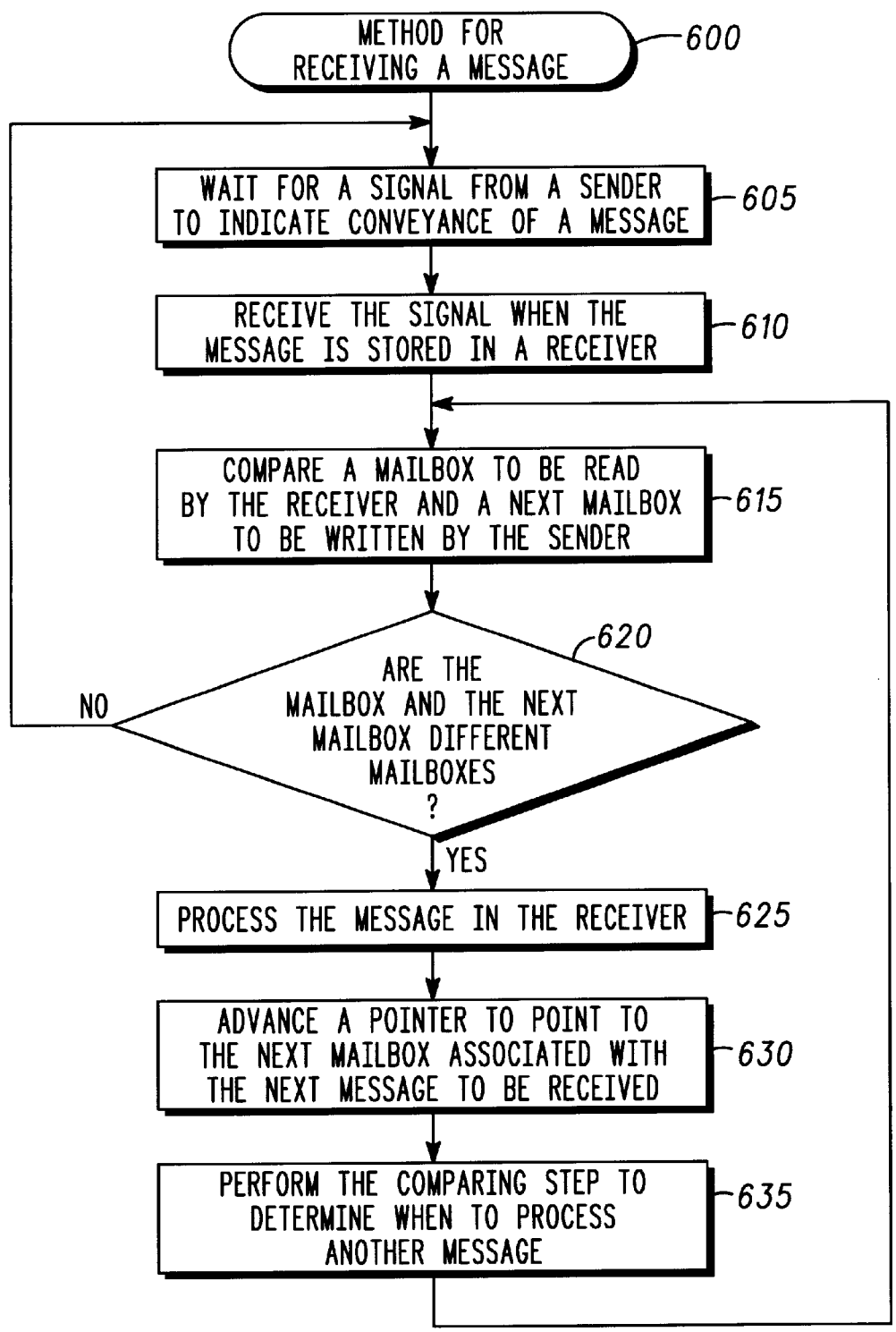
FIG. 6 is a simplified flow chart for a method for receiving a message in accordance with a preferred embodiment of the present invention.

FIG. 6 is a simplified flow chart for a method for receiving a message in accordance with a preferred embodiment of the present invention. In a preferred embodiment, method 600 is a method for receiving a message in a receiver which is transmitted from a sender. In a preferred embodiment, receiving a message includes host-to-slave and slave-to-host communications. Method 600 is performed by a receiver for both host-to-slave and slave-to-host communications. Preferably, when a message is received by a receiver, the message is stored in the memory of the slave prior to being processed by the receiver. For example, when a modem command is transmitted from a host and received by a slave which controls the modem, the message is stored in the memory for the slave prior to being processed by the slave. When a response message from a slave is received by a host, the host receives the response message into a message memory included in the slave's memory but associated with the host.

In step 605, a receiver waits for a signal from a sender to indicate conveyance of a message. In a preferred embodiment, a receiver waits for a signal (e.g., interrupt) based on a value (e.g., 1) stored in an associated message-ready interrupt. When a signal is received by the receiver, step 610 is performed. Preferably, the receiver performs processing concurrently with step 605. For example, a receiver (e.g., slave) for controlling a modem performs status operations on the modem while waiting for a signal from the host.

In step 610, the signal is received when the message is stored in a receiver. In a preferred embodiment, when a sender has completed transmission of a message to the message memory associated with the receiver, the sender writes a value into a message-ready interrupt for the receiver. The message-ready interrupt is a memory location included in the memory (e.g., DPRAM). When a value is stored in the message-ready interrupt, the memory generates an interrupt. The interrupt signals the processor for the receiver to begin processing the message.

In step 615, a mailbox to be read by the receiver is compared to a next mailbox to be written by the sender. In a preferred embodiment, the processor for the receiver compares the next-mailbox-to-read pointer and the next-mailbox-to-write pointer in the memory bank associated with the receiver. In step 620, when the pointers point to the same mailbox, no messages are awaiting processing and step 605 is repeated. In step 620, when the pointers point to different mailboxes, at least one message is awaiting processing and step 625 is performed. In step 625, the message is processed in the receiver. In a preferred embodiment, when a message is stored in the message memory associated with a receiver, the processor for the receiver processes the message. For example, when a host transmits a message to a slave for a modem, the processor for the slave processes the message and controls the modem accordingly.

In step 630, a pointer is advanced to point to the next mailbox associated with the next message to be received. In a preferred embodiment, the receiver advances the next-pointer-to-read pointer to point to the next mailbox in the ring buffer of mailboxes.

In step 635, the comparing step is performed to determine when to process another message. In a preferred embodiment, step 615 is performed to determine when another message is ready for processing. When the mailboxes compared in step 615 point to the same mailbox, step 620 causes a branch to step 605.

Thus, what has been shown are a system and method for communicating messages between elements connected via a PCI bus. What has also been shown are a system and method to securely control communication between elements connected by a PCI bus. What has also been shown are system and method providing low-cost, efficient, reliable communications within a computing environment.

The foregoing description of the specific embodiments will so fully reveal the general nature of the invention that others can, by applying current knowledge, readily modify and/or adapt for various applications for such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method of communicating messages among processing system internal to a secure terminal, the secure terminal having a host processing system, a plurality of slave processing systems, and a peripheral component interconnect (PCI) bus coupling the host with the slave processing systems, wherein each slave processing system comprises a sending memory, a receiving memory, a slave interface controller and a slave processor, wherein said PCI bus has bus request and bus grant signal lines, said bus request and said bus grant signal lines being controlled exclusively by the host processing system allowing said host processing system to exclusively control the PCI bus thereby prohibiting direct communications between the slave processing systems, wherein the sending memory of each slave processing system is partitioned into:

a sending mailbox pointer partition comprised of a first and second sending pointer, the first sending pointer indicating one of a sequential set of sending mailboxes to be accessed by the host processing system, the second sending pointer indicating another of said sequential set of said sending mailboxes for storing a message intended for the host processing system;

a sending mailbox partition comprised of said sequential set of sending mailboxes, each sending mailbox of said set of sending mailboxes storing address locations of messages intended for the host processing system; and a sending message partition for storing said messages intended for the host processing system;

the method comprising the steps of:

a first slave processor of a first of said slave processing systems checking a capacity of said sending message partition of the sending memory of said first slave processing system;

the first slave processor transmitting a first message to the said sending message partition of the sending memory of the first slave processing system when the sending memory partition has capacity to receive the first message, said first message being stored in a location of said sending memory partition of the sending memory of said first slave processing system for subsequent access by said host processing system;

the first slave processor storing an address of said first location in said sending mailbox indicated by the second sending pointer stored in the sending mailbox pointer partition of said sending memory of said first slave processing system;

the first slave processor incrementing the second sending pointer in said sending mailbox pointer partition of said sending memory of said first slave processing system;

when said first and second sending pointers are different, said host processing system reading said first message from the sending memory of said first slave processing system; and said host processing system incrementing the first sending pointer subsequent to the reading step.

2. A method as claimed in claim 1, wherein the receiving memory of each slave processing system is partitioned into:

a receiving mailbox pointer partition comprised of a first and second receiving pointer, the first receiving pointer indicating one of a sequential set of receiving mailboxes to be accessed by said slave processing system, the second receiving pointer indicating another of said sequential set of receiving mailboxes for storing a location of a message from said host processing system intended for said slave processing system;

a receiving mailbox partition comprising said sequential set of receiving mailboxes, each receiving mailbox storing an address location of a message intended for said slave processing system transmitted by the host processing system; and a receiving message partition for storing messages received from the host processing system intended for said slave processing system, and wherein when the host processing system desires to send a second message to one of the slave processing system, the method further comprises the steps of:

the host processing system transmitting said second message to the receiving message partition of the receiving memory of the first slave processing system when the receiving memory partition has capacity to receive said second message, the second message being stored in a second location of said receiving memory partition of the receiving memory of the first slave processing system for subsequent access by said first slave processor;

the host processing system storing an address of said second location in said receiving mailbox indicated by the second receiving pointer;

the hose processing system incrementing said second receiving pointer in said receiving mailbox pointer partition of said receiving memory of said first slave processing system; and when the first and second receiving pointers are different, the slave processor reading said second message from said sending memory of said first slave processing system.

3. A method as claimed in claim 2, further comprising the step of said first slave processing system incrementing said first receiving pointer stored in the receiving mailbox pointer partition of the receiving memory of the first slave processing system subsequent to said slave processor reading step.

4. In a secure terminal having a host processing system, a plurality of slave processing systems, and a peripheral component interconnect (PCI) bus coupling the host with the slave processing systems, a method of communicating a message from the host processing system to a first of the slave processing systems, the method comprising the steps of:

transmitting, by a slave processor of the first slave processing system, a first message to a sending memory of the first slave processing system when the sending memory has capacity to receive the message, said message being stored in a location of said sending memory of said first slave processing system for subsequent access by said host processing system;

the slave processor storing an address of said location in a sending mailbox indicated by a first pointer stored in the sending memory of said slave processing system;

the slave processor incrementing a second pointer in said sending memory of said first slave processing system in response to the storing step; and when said first and second pointers are different, said host processing system reading said first message from the sending memory of said first slave processing system utilizing the PCI bus, wherein said PCI bus has bus request and bus grant signal lines, said bus request and said bus grant signal lines being controlled exclusively by the host processing system allowing said host processing system to exclusively control the PCI bus thereby prohibiting direct communications between the slave processing systems.

5. A method as claimed in claim 4, wherein the first slave processing system further comprises a receiving memory separate from said sending memory, and wherein when the host processing system desires to send a second message to the first slave processing system, the method further comprising the steps of:

the host processing system transmitting said second message to the receiving memory of the first slave processing system, the second message being stored in a second location of said receiving memory for subsequent access by said first slave processor;

the host processing system storing an address of said second location in said receiving memory indicated by a first receiving pointer;

subsequent to the storing step, the host processing system incrementing a second receiving pointer in said receiving memory of said first slave processing system;

the slave processor reading said second message from said sending memory of said first slave processing system when the first and second receiving pointers are different.

6. A method as claimed in claim 5, further comprising the step of subsequent to said slave processor reading step, said first slave processing system incrementing said first receiving pointer.

7. A secure terminal comprising:

a host processing system;

a plurality of slave processing systems; and a peripheral component interconnect (PCI) bus coupling the host with the slave processing systems, wherein each slave processing system comprises a sending memory, a receiving memory, a slave interface controller and a slave processor, wherein said PCI bus has bus request and bus grant signal lines, said bus request and said bus grant signal lines being controlled exclusively by the host processing system allowing said host processing system to exclusively control the PCI bus thereby prohibiting direct communications between the slave processing systems, wherein the sending memory of each slave processing system is partitioned into:

a sending mailbox pointer partition comprised of a first and second sending pointer, the first sending pointer indicating one of a sequential set of sending mailboxes to be accessed by the host processing system, the second sending pointer indicating another of said sequential set of said sending mailboxes for storing a message intended for the host processing system;

a sending mailbox partition comprised of said sequential set of sending mailboxes, each sending mailbox of said set of sending mailboxes storing address locations of messages intended for the host processing system; and a sending message partition for storing said messages intended for the host processing system;

wherein a first slave processor of a first of said slave processing systems checking a capacity of said sending message partition of the sending memory of said first slave processing system, transmits a first message to the said sending message partition of the sending memory of the first slave processing system when the sending memory partition has capacity to receive the first message, said first message being stored in a location of said sending memory partition of the sending memory of said first slave processing system for subsequent access by said host processing system, stores an address of said first location in said sending mailbox indicated by the second sending pointer stored in the sending mailbox pointer partition of said sending memory of said first slave processing system, increments the second sending pointer in said sending mailbox pointer partition of said sending memory of said first slave processing system, and when said first and second sending pointers are different, said host processing system reads said first message from the sending memory of said first slave processing system and increments the first sending pointer.

8. A secure terminal as claimed in claim 7, wherein the each slave processing system further comprises interface logic to receive the message from the bus and to store the message in the memory.

9. A secure terminal as claimed in claim 7, wherein the receiving memory of each slave processing system is partitioned into:

a receiving mailbox pointer partition comprised of a first and second receiving pointer, the first receiving pointer indicating one of a sequential set of receiving mailboxes to be accessed by said slave processing system, the second receiving pointer indicating another of said sequential set of receiving mailboxes for storing a location of a message from said host processing system intended for said slave processing system;

a receiving mailbox partition comprising said sequential set of receiving mailboxes, each receiving mailbox storing an address location of a message intended for said slave processing system transmitted by the host processing system; and a receiving message partition for storing messages received from the host processing system intended for said slave processing system, and wherein when the host processing system desires to send a second message to one of the slave processing system, the host processing system transmits said second message to the receiving message partition of the receiving memory of the first slave processing system when the receiving memory partition has capacity to receive said second message, the second message being stored in a second location of said receiving memory partition of the receiving memory of the first slave processing system for subsequent access by said first slave processor, the host processing system stores an address of said second location in said receiving mailbox indicated by the second receiving pointer, the hose processing system increments said second receiving pointer in said receiving mailbox pointer partition of said receiving memory of said first slave processing system, and when the first and second receiving pointers are different, the slave processor reads said second message from said sending memory of said first slave processing system.

10. A secure terminal as claimed in claim 9, wherein subsequent to said slave processor reading said second message, said first slave processing system increments said first receiving pointer stored in the receiving mailbox pointer partition of the receiving memory of the first slave processing system.

11. A secure terminal as claimed in claim 7, wherein the send memory is a dual port random access memory (RAM).

12. A secure terminal comprising:

a host processing system;

a plurality of slave processing systems; and a peripheral component interconnect (PCI) bus coupling the host processing system to the slave processing systems, said PCI bus has bus request and bus grant signal lines, said bus request and said bus grant signal lines being controlled exclusively by the host processing system allowing said host processing system to exclusively control the PCI bus thereby prohibiting direct communications between the slave processing systems, wherein when a first of the slave processing systems desires to send a message to the host processing system, a slave processor of the first slave processing system transmits the message to a sending memory of the first slave processing system when the sending memory has capacity to receive the message, said message being stored in a location of said sending memory of said first slave processing system for subsequent access by said host processing system, the slave processor stores an address of said location in a sending mailbox indicated by a first pointer stored in the sending memory of said slave processing system, the slave processor incrementing a second pointer in said sending memory of said first slave processing system in response to the slave processor storing, and when said first and second pointers are different, said host processing system reads said first message from the sending memory of said first slave processing system utilizing the PCI bus.

13. A secure terminal as claimed in claim 12, wherein:

the first slave processing system further comprises a receiving memory separate from said sending memory, and wherein when the host processing system desires to send a second message to the first slave processing system, the host processing system transmits said second message to the receiving memory of the first slave processing system, the second message being stored in a second location of said receiving memory for subsequent access by said first slave processor, the host processing system stores an address of said second location in said receiving memory indicated by a first receiving pointer, subsequent to the storing said address, the host processing system increments a second receiving pointer in said receiving memory of said first slave processing system, and the slave processor reads said second message from said sending memory of said first slave processing system when the first and second receiving pointers are different.

14. A secure terminal as claimed in claim 13, wherein subsequent to said slave processor reading said first slave processing system incrementing said first receiving pointer.

* * * * *